United States Patent [19]
Faroudja et al.

[11] Patent Number: 4,864,389
[45] Date of Patent: Sep. 5, 1989

[54] COMB FILTER METHOD AND APPARATUS FOR CHROMINANCE AND LUMINANCE SEPARATION IN QUADRATURE MODULATED COLOR SUBCARRIER TELEVISION SYSTEMS

[75] Inventors: Yves C. Faroudja, Los Altos; Jack J. Campbell, San Francisco, both of Calif.

[73] Assignee: Faroudja Laboratories, Inc., Sunnyvale, Calif.

[21] Appl. No.: 178,852

[22] Filed: Mar. 31, 1988

Related U.S. Application Data

[63] Continuation of Ser. No. 858,587, May 1, 1986, abandoned.

[51] Int. Cl.$^4$ .............................................. H04N 9/78
[52] U.S. Cl. ....................................................... 358/31
[58] Field of Search ........................................... 358/31

[56] References Cited

U.S. PATENT DOCUMENTS

| | | | |
|---|---|---|---|
| 4,456,922 | 6/1984 | Balaban et al. | 358/31 |
| 4,562,460 | 12/1985 | Harwood | 358/28 |
| 4,688,080 | 8/1987 | Wagner | 358/31 |

FOREIGN PATENT DOCUMENTS

| | | | |
|---|---|---|---|
| 0111596 | 7/1983 | Japan | 358/31 |
| 151592 | 8/1984 | Japan | 358/31 |
| 69291 | 4/1986 | Japan | . |
| 2054313 | 2/1981 | United Kingdom | 358/31 |
| 2072991 | 10/1981 | United Kingdom | 358/31 |
| 2079091 | 1/1982 | United Kingdom | 358/31 |

Primary Examiner—John W. Shepperd
Attorney, Agent, or Firm—David B. Harrison

[57] ABSTRACT

An improved comb filter extracts at least one of chroma and luminance from a quadrature modulated subcarrier color television input signal. The described method implemented by the described apparatus includes the steps of delaying the input signal through a plurality of predetermined delay periods wherein the duration of each delay period is related to line scan period or picture frame period, filtering the undelayed and delayed signals so that energy components of the input signal lying in the vicinity of the chroma subcarrier frequency are passed, thereby providing bandpass filtered undelayed and delayed signals, detecting amplitude and sense of periodic transitions lying in the chroma energy passband, multiplying two of the undelayed and delayed signals by the continuously variable coefficients to produce an error correction signal corresponding substantially to the following approximation:

$$e = \tfrac{1}{4}(V1-V3)(\overline{|V3+V2|} - \overline{|V1+V2|})$$

wherein | | denotes that the value enclosed thereby is limited to a maximum amplitude level and wherein BAR V indicates the absolute value thereof, additively combining a linear function of the delayed and undelayed signals with the error correction signal, thereby extracting at least one of the luminance and chrominance components of the input signal at the chroma passband without luminance artifacts and chroma blurring during periodic chroma transitions.

8 Claims, 5 Drawing Sheets

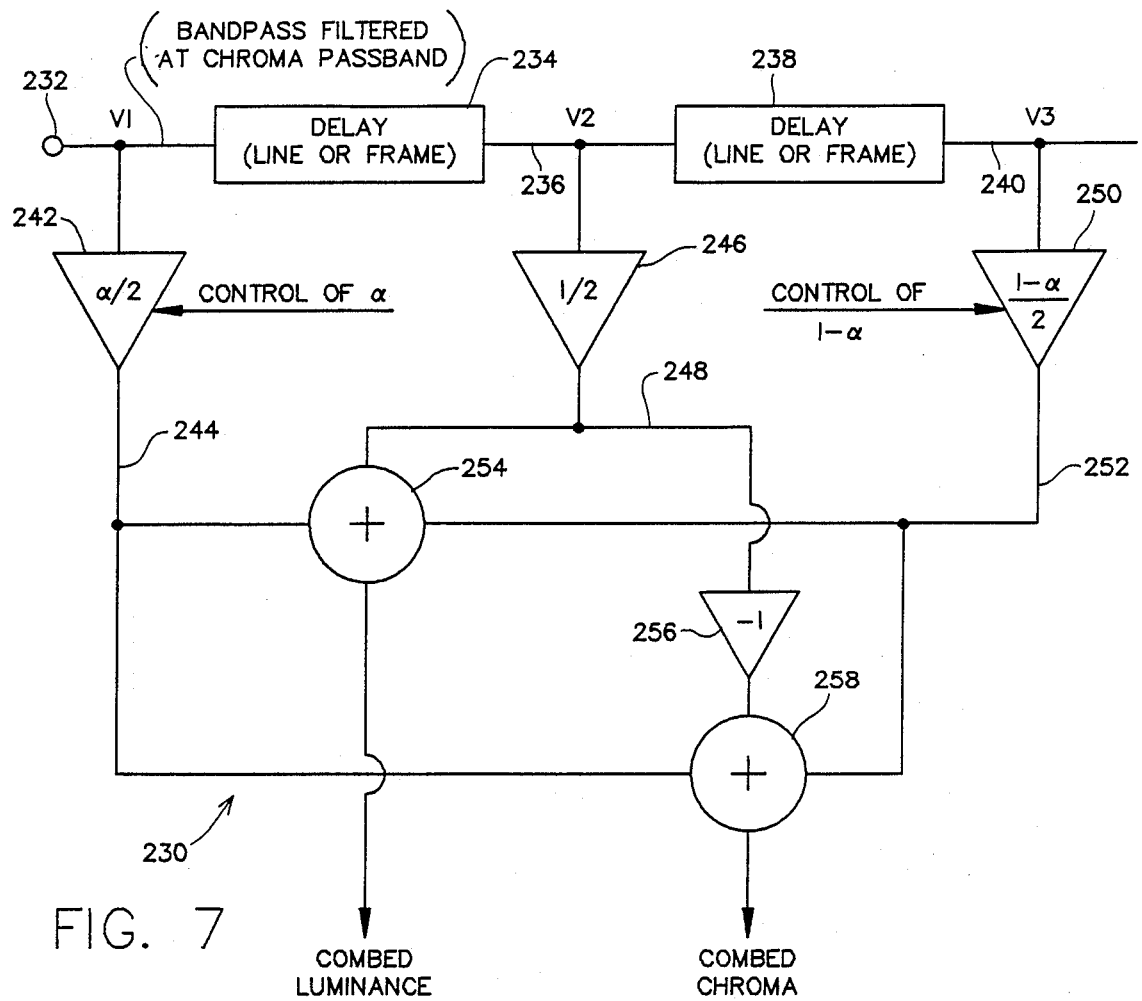
FIG. 7
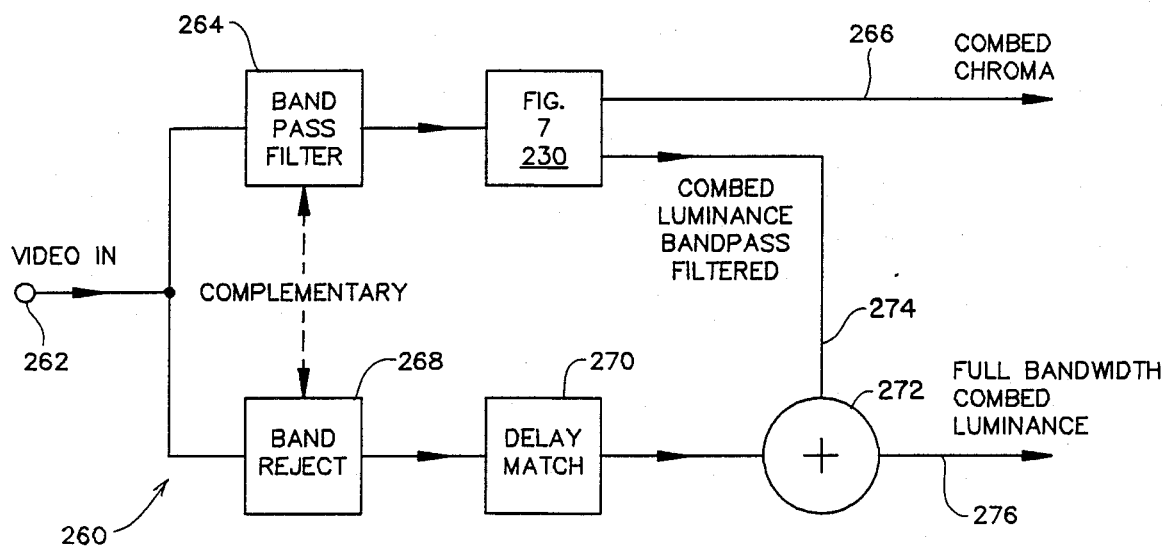
FIG. 8 — INSERTION OF FIG. 7 CIRCUIT IN SYSTEM

COMB FILTER METHOD AND APPARATUS FOR CHROMINANCE AND LUMINANCE SEPARATION IN QUADRATURE MODULATED COLOR SUBCARRIER TELEVISION SYSTEMS

This patent application is a continuation of U.S. patent application Ser. No. 858,587, filed on May 1, 1986, now abandoned.

BACKGROUND OF THE INVENTION

The present invention relates to signal processing equipment and methods for processing quadrature modulated color subcarrier television signals. More particularly, the present invention relates to improved control methods and circuitry enabling precision operation of comb filtering apparatus without introduction of any artifacts into the resultant signal on account of chrominance transitions in the vertical and temporal (time) domains.

Passive comb filtering techniques are known for separating chrominance and luminance components of a quadrature modulated color television picture signal. Such comb filters are typically implemented with single or multiple scan line and picture frame period delays. Since the phase of chrominance is in opposition from line to line and from frame to frame (in the NTSC signal format), the process of adding a present scanning line to a line which has been delayed by one scanning line period, or adding a frame to a frame which has been delayed by one picture frame period, results in phase cancellation elimination of the chrominance component, and resultant extraction of the luminance component from the composite video color signal. By a subtractive process the chrominance component likewise may be extracted from the composite video.

In quadrature modulated color subcarrier television signal formats, comb filtering is achieved by the process of adding information coming from a certain number of successive scanning lines. This manipulation is limited to spectral areas containing both the luminance and chrominance components (e.g. 2.3 to 4.2 MHz in the NTSC format) by means of bandpass filters. The full bandwidth luminance information is typically obtained by addition of the combed bandpass filtered component and a delay matched band-reject filtered component. The addition of signals coming from successive lines is carried out by taking the signal from the first line, for example, and multiplying the signal by a certain coefficient, and adding the signal from a second line as multiplied by a second certain coefficient, and adding the signal from a third line as multiplied by a third certain coefficient. In a typical situation, where the signal from line 1 is V1, the signal from line 2 is V2, and the signal from line 3 is V3, a standard comb filter arrangement is:

$$Y = \tfrac{1}{4} V1 + \tfrac{1}{2} V2 + \tfrac{1}{4} V3$$

(luminance in the vicinity of the subcarrier spectral area) and $$C = \tfrac{1}{4}(2V2 - V1 - Vc) \text{ (chrominance)}.$$

In this example, the fractional values $\tfrac{1}{4}$ and $\tfrac{1}{2}$ are the coefficients of the comb.

Similar computations apply to temporal comb filters, where V1, V2 and V3 represent signals which are either undelayed (V1) or delayed by one picture frame period (V2) or by two picture frame periods (V3).

When compared to band pass filters and traps, passive comb filters work very well for separating chrominance and luminance, due to their wide bandwidth. However, the performance of passive comb filters breaks down when changes occur between lines or frames. When such changes appear, phase cancellation (averaging) from line to line or from frame to frame of the unwanted component does not perfectly occur. Instead, artifacts such as chroma blurring and horizontal dots in the luminance at the chroma subcarrier frequency are generated by the comb filtering process and may be objectionably visible to the viewer, particularly as the bandwidth of television displays has increased to include frequencies lying well above the subcarrier frequency (3.58 MHz in the NTSC system).

A number of proposals have been presented in the prior art for changing the comb filter structure or operation during transition conditions in an attempt to avoid the unwanted picture artifacts otherwise produced. In essence, the prior approaches have been either to alter the structure of the comb filter by on-off switching operations and/or to substitute a trap or other bandwidth limiting filter in place of the comb filter for the interval in which comb filter separation of chrominance/luminance breaks down. These prior attempts to make otherwise passive comb filters adaptive at vertical chroma transitions have not achieved a satisfactory solution to eliminate unwanted picture artifacts while maintaining high bandwidth characteristics of the comb filter, as will now be explained in greater detail.

One drawback of a trap or notch filter is that it is unidimensional, which is to say it only processes information occurring at the line scan rate. On the other hand, a comb filter may be operated in the horizontal and also in the temporal (picture frame to picture frame) domains.

One prior proposal is set forth in the Rossi U.S. Pat. No. 4,050,084. This patent describes a digitally implemented two scanning line delay comb filter for putting out a combed chroma component and a combed luminance component when there is no change of chrominance in the vertical direction (from line to line). The Rossi comb filter generates a combed chrominance component in the form of:

$$C_c = \frac{2V2 - V1 - V3}{4}$$

$C_c$ being band pass filtered, and generates a combed luminance component in the form of:

$$Y = V_2 - C_c$$

where V1 corresponds to the undelayed picture signal at the vicinity of the chroma subcarrier (3.58 MHz in the NTSC system), V2 corresponds to one scan line period delayed video, and V3 corresponds to two scan line period delayed video.

When the Rossi system detects a vertical amplitude transition in the chroma between two adjacent scan lines, Rossi's chroma comb filter system thereupon switches to a 0 V1 + $\tfrac{1}{2}$ V2 − $\tfrac{1}{2}$ V3 configuration for the vertical chroma transition interval at the first line thereof, and then switches to a − $\tfrac{1}{2}$ V1 + $\tfrac{1}{2}$ V2 + 0 V3 configuration for the vertical chroma transition interval at the second line thereof. This reconfiguration of the Rossi comb filter is carried out in real time by manipulation between zero and one half amplitude coefficient values for the V1 and V3 terms of the comb during the transition. Thus, Rossi's progressive adaptation of the comb filter structure by coefficient manipulation enables it to avoid the chroma transition and the artifacts otherwise produced. In other words, the Rossi comb filter is adaptive in the sense that in the absence of a vertical chroma transition the output is combed on the basis of three scanning lines. When a vertical chroma transition occurs, combing reverts to a two scanning line basis, with information being combed coming during the first line of the transition from the second and third lines, and with information being combed coming during the second line of the transition from the first and second lines. One of the drawbacks of the Rossi system is that if there are multiple chroma transitions within three adjacent scan lines, the Rossi comb filter logic collapses, and that system switches to a notch filter for the duration of the trouble. That is to say, if V1 is different from V2 and V2 is different from V3, then the Rossi system switches from comb filter processing to a low pass filter in the luminance path and to a band pass filter (notch) in the chrominance path.

A significant drawback of the Rossi system is that it is controlled only upon detection of changes in chroma amplitude. The control signal relied upon by the Rossi system employs the difference of the rectified chroma from line to line. If, for example, a color phase shift (change in hue) occurs between two lines and it is not accompanied by a comensurate amplitude shift, the Rossi system is not capable of switching off the comb filter, and horizontal dots appear in the luminance in one or more scan lines of the picture.

A further drawback of the Rossi system is that it makes use of hard switching between the three operational configurations. There is no proportional or gentle switching between the three modes, and the switching transitions are abrupt.

Another comb filter system in the prior art was developed by Barco Electronic n.v., Noordlaan 5 Industriezone, B-8720 Kuurne, Belgium and was included in color television decoding apparatus introduced into the United States in about 1981. The Barco system was similar to that described in the Rossi patent, in that combing was switched from three lines to two lines in a manner that attempted to skirt the chrominance vertical transition. The Barco apparatus required an additional scan period delay line in order to provide a one line period look ahead or advance warning that a vertical chroma transition was imminent. Once a transition was detected on a look ahead basis, the Barco apparatus changed the coefficients of the comb on a step function (yes or no basis) by switching from the three line-based configuration to two two-line-based comb filter configurations during the line blanking interval for the lines having the detected chroma vertical transition. For the scan line preceding the chroma vertical transition the Barco comb filter coefficients would be:

$$Y = \tfrac{1}{4} V1 + \tfrac{1}{2} V2 + \tfrac{1}{4} V3$$

(luminance comb wherein V1, V2 and V3 are bandpass filtered and Y refers to luminance components in the vicinity of the subcarrier energy spectral area). At the first line of the transition, the Barco comb filter coefficients are changed to:

$$Y = 0\, V1 + \tfrac{1}{2} V2 + \tfrac{1}{2} V3.$$

At the second line of the transition, the Barco comb filter coefficients are changed still further to:

$$Y = \tfrac{1}{2} V1 + \tfrac{1}{2} V2 + 0\, V3.$$

In this way, it is seen that the Barco filter structure is reconfigured by manipulation of coefficient values to "skirt around" the transition and thereby avoid the characteristic picture artifacts otherwise generated by imperfect combing at the transition.

One immediately apparent drawback of the Barco approach was that an entire scan line of video information was necessarily modified as a result of switching during the horizontal blanking interval, even though only a very small portion of the scan line was subject to degradation by the presence of a vertical chroma transition. As a result, in some situations high frequency luminance components became offset spatially by one line with diagonal transitions taking on a visible raggedness or step effect.

The Barco system had the same drawback as the Rossi system in that it made use only of information in the chroma bandwidth in the vicinity of the color subcarrier in order to control the switching action.

Co-inventor Faroudja's prior U.S. Pat. No. 4,179,705 describes a method for switching comb filter apparatus. Essentially, the '705 patent describes a method to switch off the comb filter and replace it with a low pass filter in the luminance path and a band pass filter in the chrominance path in the presence of a vertical transition. The vertical transition was detected by looking at the differences in chroma energy on a line to line basis. While this system worked reasonably well, it had a time constant (slight delay) during which to make a control decision and suffered from the frequent situation that the chroma picture information is a very weak source of information upon which to make a decision concerning chroma processing. The slight delay in the control led to poorly defined (fuzzy or soft) chroma transitions during switching. Reducing the delay led to excessive control circuit implementation costs. Thus, the system either cost too much, or it let two or three horizontal dots get through to the display screen before the trap was switched in. Also, while this system worked well under test signal conditions, it proved inefficient in processing real picture signal content.

Mr. Faroudja's more recent U.S. Pat. No. 4,240,105 performs the same switching operation as was described in his '705 patent, but in response to different, additional control information. The system described in the '105 patent makes use not only of the chroma difference in the vertical domain but also the low frequency luminance difference which is statistically highly correlated to simultaneous chroma transitions and which provides a much stronger, more robust signal upon which to develop a switching control signal. However, while the switching based on the luminance transition was faster than the prior approach, the process of switching to a notch filter or trap in lieu of the comb filter structure during detected chroma transitions led to visibly soft transition edges: i.e. the reduced bandwidth resulting from the trap caused the picture to lack sharpness at the chroma transition.

In summary, each of these prior approaches had significant drawbacks. Substitution of low pass and band pass filters in lieu of the comb filter introduced blurring and ringing artifacts into the luminance and chrominance paths during the transition interval. Switching operations introduced transients into the picture which were not easily removed except at substantial circuit complexity and implementation expense. Switching during the blanking interval masked the switching transients problem, but substituted different scan line video composites on a line by line basis, rather than only during the chroma vertical transition interval. Furthermore, these prior systems did not separate adequately the chroma and luminance components during chroma vertical transition intervals occurring over more than one line period and occurring in a non-linear fashion.

Moreover, the adaptation of prior comb filter structures was limited to step function transitions of coefficients, such as between zero, one quarter, and one half unity values. No attempt was made to derive or use continuously and smoothly variable coefficients in a range between zero and unity, based upon the particular characteristics of each chroma vertical transition actually encountered in real television pictures. And, the step function switching of coefficients was abrupt, and necessitated care in design, and circuit complexity and expense in implementation in order to minimize switching transients.

A hitherto unsolved need has therefore arisen for improved control methods and circuitry enabling more precise control and adaptive operation of comb filtering apparatus in quadrature modulated color subcarrier television decoding apparatus which avoids introduction of any artifacts into the resultant signal on account of chrominance transitions in the vertical or temporal domain, irrespective of the particular characteristics of the transition (whether in the amplitude or phase parameter, and whether linear or non-linear in either parameter).

SUMMARY OF THE INVENTION WITH OBJECTS

A general object of the present invention is to provide an improved comb filter apparatus and method for separating chroma information and luminance information in a quadrature modulated color subcarrier television system which overcomes the limitations and drawbacks of the prior art.

A more specific object of the present invention is to provide a comb filter apparatus making use of a combination of a plurality of video signals which are undelayed and delayed by an integral number of time periods related to scanning line or frame periods, each signal of the combination being used being bandpass filtered around the subcarrier energy spectral area, and then multiplied by a coefficient prior to addition, and wherein each coefficient is being continuously varied and optimized in numerical value based upon the characteristics of the chroma vertical or temporal transition in order to minimize chroma residues (artifacts) in the luminance path, and chroma blurring in the chroma path, otherwise produced by passive comb filter signal processing.

Another more specific object of the present invention is to provide a comb filter apparatus which generates multiplication coefficients for controlling instantaneous amplitudes of a plurality of video signals wherein each coefficient is selected from a multiplicity of available values in a predetermined range so that the comb filter apparatus adapts to the particular characteristics of the transition in a manner which eliminates unwanted artifacts otherwise produced by an unadapted comb filter in response to the transition.

Another specific object of the present invention is to provide comb filter apparatus having a structure which is adaptively changed during chroma vertical or temporal transitions by use of an additive correction path, rather than by substitution or switching operations in the main path. In this way, an error signal is applied additively to the main path in order to correct a minor deficiency therein, with the remainder of the main path content being unaffected by the correction process. Thus, the correction process is directed only to that portion of the main path picture spectrum requiring correction, and all other portions are left alone. With this approach, the correction processing apparatus may be implemented with far less complexity and at less expense than if it operated upon the entire main path.

A further object of the present invention is to provide a method for operating a comb filter structure in a manner which corrects comb filter coefficients based upon the residues or artifacts otherwise resulting from comb filter processing employing uncorrected coefficients, thereby enabling precise cancellation of the residues themselves.

One more object of the present invention is to provide an improved comb filter method and apparatus which operates effectively in either or both the horizontal line scan domain and the picture frame time domain.

These objects, advantages and features are achieved in an improved method and apparatus for separation of chrominance and luminance components in a quadrature modulated color subcarrier television signal. The improved comb filter extracts at least one of chroma and luminance from a quadrature modulated subcarrier color television input signal. The new method implemented by the new apparatus includes the steps of delaying the input signal through a plurality of predetermined delay periods wherein the duration of each delay period is related to line scan period or picture frame period, filtering the undelayed and delayed signals so that energy components of the input signal lying in the vicinity of the chroma subcarrier frequency are passed, thereby providing bandpass filtered undelayed and delayed signals, detecting amplitude and sense of periodic transitions lying in the chroma energy passband, multiplying two of the undelayed and delayed signals by the continuously variable coefficients to produce an error correction signal corresponding substantially to the following approximation:

$$e = \tfrac{1}{4}(V1 - V3)(|\overline{V3 + V2} - \overline{V1 + V2}|),$$

wherein | | denotes that the value enclosed thereby is limited to a maximum amplitude level and wherein BAR V indicates the absolute value thereof, additively combining a linear function of the delayed and undelayed signals with the error correction signal, thereby extracting at least one of the luminance and chrominance components of the input signal of the chroma passband without luminance artifacts and chroma blurring during periodic chroma transitions.

These and other aspects, objects, advantages and features of the present invention will be more fully understood and appreciated by consideration of the following detailed description of preferred embodiments, presented in conjunction with the accompanying drawings.

BRIEF DESCRIPTION OF THE DRAWINGS

In the Drawings:

FIG. 5 is a block diagram of a second preferred embodiments incorporating the principles of the present invention and which provides for continuously variable coefficients for the different delay periods to be generated in relation to the nature of the chromas vertical transition so as to achieve more optimal comb filter separation of chrominance and luminance components of the color signal under all operating situations.

FIG. 7 is a block diagram of a third preferred embodiment incorporating the principles of the present invention and which also provides for continuously variation of the V1 and V3 coefficients, while the V2 coefficient is present at a nominal fixed value, such as one half.

FIG. 8 represents a chrominance/luminance separation system which operatively includes the FIG. 7 apparatus therein.

DETAILED DESCRIPTION OF PREFERRED EMBODIMENTS

Figure 1:
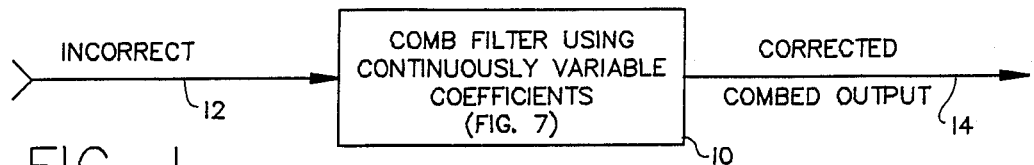
FIG. 1 is a simplified block diagram illustrating the process of signal correction processing in a main path including a comb filter of a quadrature modulated color subcarrier television system.

FIG. 1 illustrates in overview a corrector 10 which is interposed in a main path having a bandpass filtered, uncombed input 12 and a corrected signal output 14 in a quadrature modulated color subcarrier television system. This FIG. 1 configuration may be desired when main path processing accompanies the error correction. The alternative preferred embodiment depicted in FIG. 7 provides an appropriate example. Therein, the signal corrector separates luminance and chrominance by adaptive comb filter processing and without unwanted chroma and luminance artifacts incident to periodic chroma transitions.

Figure 2:
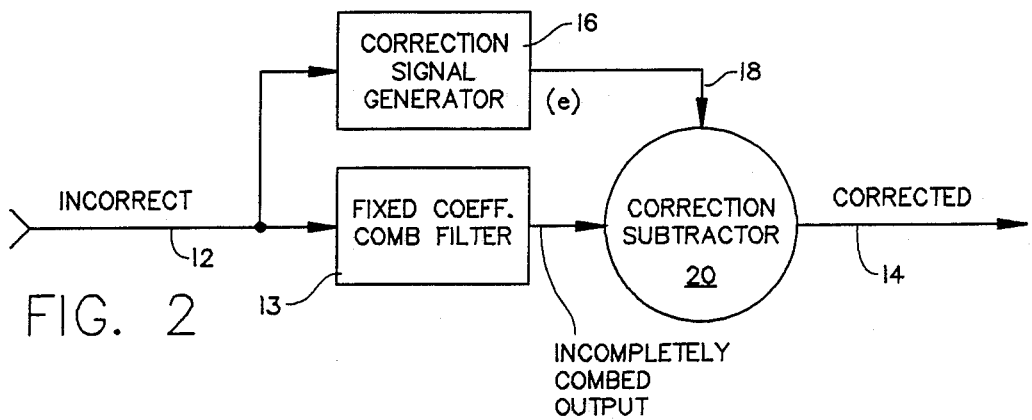
FIG. 2 is a simplified block diagram illustrating the process of additive signal correction processing for subtractively combining an error signal (e) with the comb filter processed signal present in the main path to achieve a corrected signal.
Figure 4:
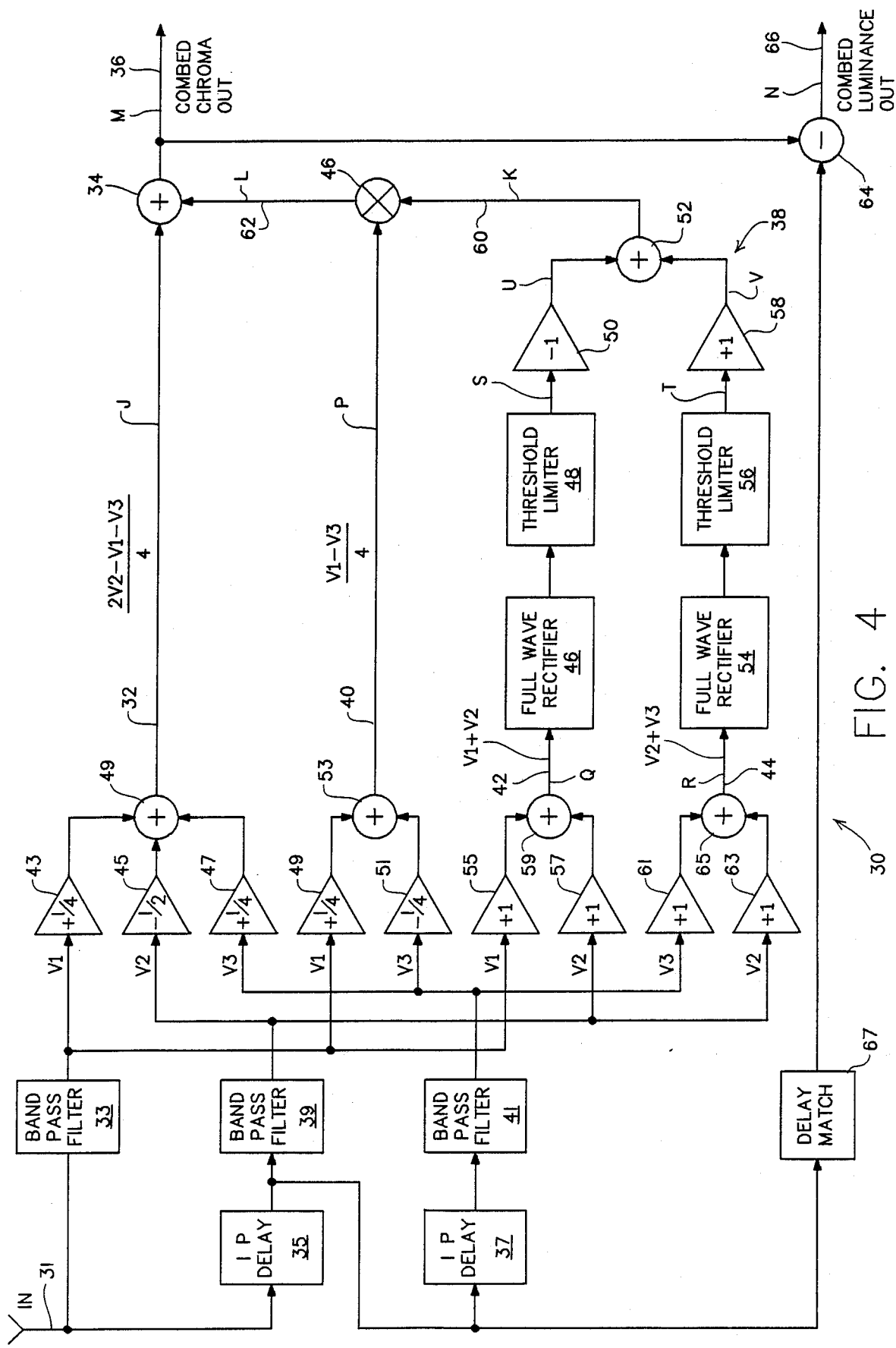
FIG. 4 is a block diagram of a first preferred embodiment incorporating the principles of the present invention.
Figure 6:
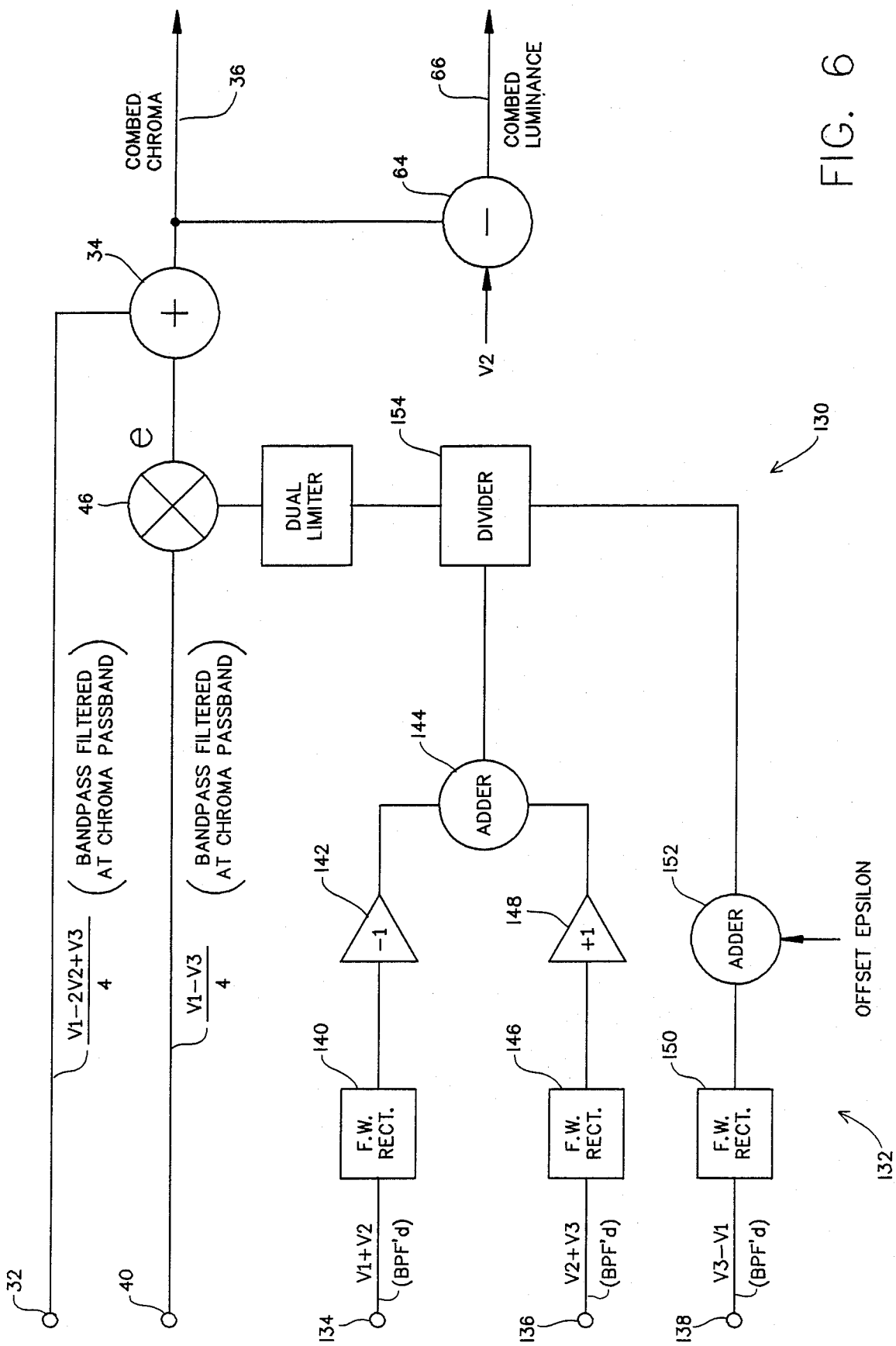

On the other hand, if error correction processing is based only upon a small segment of the signal spectrum, such as chrominance, which rarely, if ever, amounts to more than twenty percent of the picture spectrum, then the additive processing technique depicted in overview in FIG. 2 is superior. Therein, a correction signal generator 16 is connected to an input 12 of the main path which includes, for example, a fixed coefficients, or passive comb filter 13 for separating at least one of luminance and chroma in conventional manner. The correction signal generator 16 generates and puts out an error signal (e) over a line 18 to a correction signal subtractor 20 in the main path downstream of the comb filter 13. The subtractor 20 subtracts the error signal (e) from the main path signal, which yields a corrected signal on the output path segment 14. The correction signal generator 16 may be specifically tailored to the portion of the main path spectrum to be corrected (e.g. chroma bandpass) and therefore may be implemented with narrower bandwidth components and at considerably less expense than if it were required to pass the entire main path spectrum without degradation. While FIG. 2 depicts the correction signal generator 16 and the convention comb filter 13 as separate elements, in practical implementations, delay lines forming the comb filter 13 generate various signals which may be used by the correction signal generator 16 so that the number of delay lines (and overall cost of the practical implementation) is minimized, and there would be a number of lines between the two elements 13 and 16. The preferred embodiments depicted in FIGS. 4 and 6 are examples of additive path processors of which FIG. 2 presents a more general case.

Figure 3:
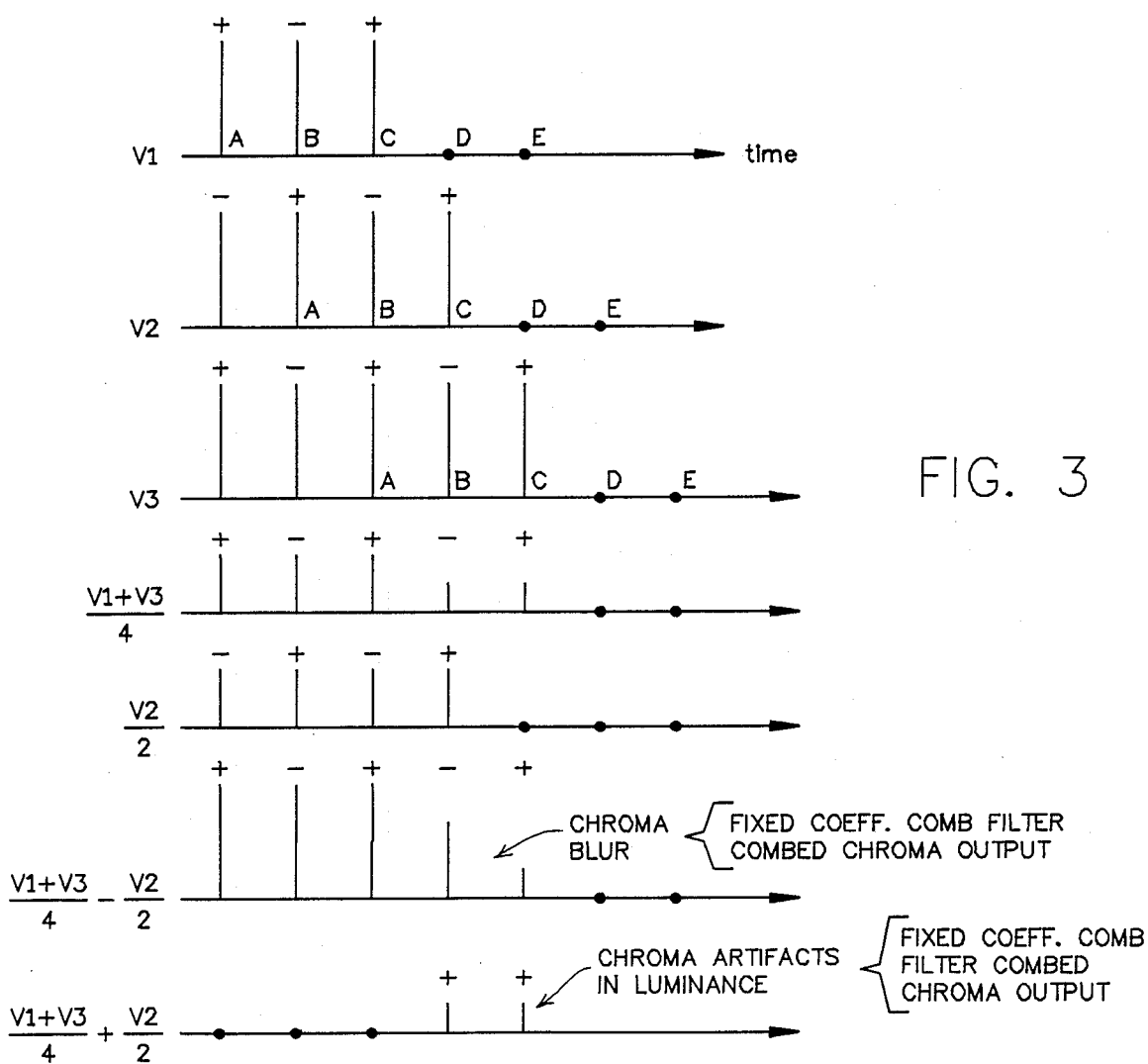
FIG. 3 sets forth a series of graphs which illustrate operation of a conventional passive comb filter at a chroma vertical transition and the production of unwanted artifacts in both the chroma path and the luminance path.

FIG. 3 is presented by way of background information and illustrates the response of a passive comb filter to a sharp chroma transition. In the first graph, labelled V1 (denoting bandpass filtered undelayed video), chroma subcarrier amplitude is at a high level as measured at recurrent equal time periods A, B, and C. The pluses and minuses appearing at the top of each chroma amplitude line denote the chroma subcarrier relative phase shift from line to line and from frame to frame in the NTSC signal format, by reference to the horizontal synchronization pulse. At period D, and subsequent (E and following) the chroma amplitude has gone to zero value. (The period between A and B, for example, may be the horizontal line scanning rate in a horizontal domain comb filter processor, or it may be the picture frame rate in a time domain comb filter processor).

In the second graph, labelled V2 (denoting a tone time period delay), the signals are the same as in the V1 graph, except that they are delayed by one full time period.

In the third graph, labelled V3 (denoting a two time period delay relative to V1), the signals are the same as in the V1 graph except that they are delayed by two full time periods.

In the fourth graph, labelled ¼ (V1+V3), the instantaneous chroma amplitude values of the V1 and V3 signals have been added and the resultant sums have been divided by four.

In the fifth graph, labelled ½ V2, the V2 signals from the second graph have had their amplitudes reduced by half.

In the sixth graph, labelled ¼ (V1+V3)−½ V2, a passive chrominance comb filter has been achieved, by subtracting the signal from the fifth graph from the signal from the fourth graph. This process shows that as a result of the chroma amplitude transition between the periods C and D, two chroma amplitude values are incorrect and are displayed in the picture as a soft color shift at the transition. This constitutes an artifact generated by the passive comb filter.

In the seventh graph, labelled ¼ (V1+V3)+½ V2, a passive luminance comb filter has been realized, by adding the signal from the fifth graph to the signal from the fourth graph. The combing process depicted in the seventh graph is anlyzed therein only in the spectrum located in the vicinity of the color subcarrier. This process shows that as a result of the chroma amplitude transition between the periods C and D, two unwanted luminance amplitude values labelled luminance combing residue and displayed in the picture as luminance dots at the subcarrier frequency have been generated as artifacts by the passive comb filter. It is these artifacts which are to be removed in accordance with the principles of the present invention.

If Yc represents the combed luminance information located in the same frequency area as the chrominance information, (e.g. 2.3 to 4.2 MHz in the NTSC format), Yc will include unwanted artifacts resulting from incomplete and therefore improper combing during periodic chroma transitions. Again, the following discussion is limited to bandpass filtered signals; this is, signals located in the vicinity of the chroma subcarrier. By "periodic chroma transition" is meant a chroma amplitude or phase transition occurring over a period related to the scanning process. In the case of vertical chroma transitions, the period is the horizontal line scanning rate; in the case of temporal chroma transitions, the period is the picture frame rate.

Correct luminance combing is obtained when Yc=0 during a chromas transition. It will be appreciated by those skilled in the art that Y will have some value other than zero during steady state picture conditions not including a periodic chroma transition.

In an "N" paths comb filter where the coefficients of successive scanning periods are given by A, B, C, .... N, elimination of unwanted artifacts is obtained by the following:

$$Yc = AV1 + BV2 + CV3 + \ldots NVn = 0 \quad (1)$$

the coefficients A, B, C, .... N being continuously variable in order to satisfy the condition that the sum of Equation (1) equal zero during the presence of a chroma transition.

A more specific mathematical statement which, when implemented functionally, will eliminate the FIG. 3 artifacts from the luminance path, as well as chroma blurring from the chroma path, by main path processing of the type illustrated in FIGS. 1 and 7, is given as follows:

$$Yc = \tfrac{1}{2}[V2 + (a)V1 + (1-(a))V3] = 0 \quad (1A)$$

Equation (1A) is a specific case of Equation (1) and represents a family of preferred embodiments of the present invention in which:

(a) The number of scanning periods used for combing is limited to three;

(b) The coefficient of the center scanning period V2 is equal to one half at all times and does not vary (except if V1=V3=/=−V2);

(c) The coefficients of the first (V1) and third (V3) scanning periods are continuously variable, while their sum is equal to one half, in order to minimize, during chroma transitions, the high frequency combed luminance Yc, and therefore eliminate artifacts and blurring.

Concurrently, chrominance combing output Cc is represented by:

$$Cc = \tfrac{1}{2}[V2 - (a)V1 = (1=(a))V3] \quad (1B)$$

Alpha (a) represents a variable coefficient which varies with time in a such a manner that Equation (1) will equal zero, for any value of V1, V2 and V3 during the periodic chroma transition. It may be proven mathematically that alpha (a) is as follows:

$$(a) = \frac{V2 + V3}{V3 - V1} \quad (2)$$

under the condition that V1=/=V3. If V1=V3 the structure of the comb filter is changed as follows:

(a) If V1=V3=−V2, then we set alpha (a)=½. This is the steady state case where no periodic chroma transitions are present.

(b) If V1=V3=/=−V2 then all three coefficients are switched to zero value, so that combed luminance Yc in the passband which includes chroma is zero, but low frequency energy groups of luminance are maintained. This is the "notch filter" mode, where luminance bandwidth is reduced for some very rare and very specific picture conditions, namely when more than one chroma transition occurs during the three period interval utilized for comb filtering. (One very rare picture condition is where a color television picture camera is badly out of vertical registration.)

As already discussed, in some processing situations it is highly advantageous to generate an error correction signal (e) and apply it over a separate path to a main path signal for error correction. At the subcarrier frequency, the error signal (e) in accordance with the principles of the present invention is given by the expression:

$$e = \tfrac{1}{2}(V1 - V3)\left| \frac{\overline{(V2 + V3)} - \overline{(V2 + V1)}}{\overline{V3 - V1} + \text{Epsilon}} \right| \quad (3)$$

where the BAR over a V indicates a full wave rectified or absolute numerical value for V, | | indicates that the value enclosed thereby has been limited to a selected maximum amplitude and where Epsilon is a constant which eliminates any possibility of indeterminateness arising from a solution of Equation (3) equalling zero divided by zero. This Equation (3) is implemented by the FIG. 6 circuitry, described hereinafter.

A simplified form for error correction is as follows:

$$e = \tfrac{1}{2}(V1 - V3)(|\overline{V3 + V2} - \overline{V1 + V2}|) \quad (4)$$

where the symbols are of the same convention as followed in Equation (3). This Equation (4) is implemented by the circuitry of FIG. 4, now to be described.

FIG. 4 depicts a comb filter 30 including an input 31 for receiving an NTSC format composite color subcarrier video signal, for example. The signal on the line 31 is passed through a band pass filter 33 which has a passband centered about the color subcarrier and which in the NTSC format has cutoff points at about 2.5 MHz and 4.7 MHz. A V1 signal which includes the passed high frequency energy groups of luminance and the chrominance energy groups is produced by the filter 33.

The input signal on the line 31 is also passed through two tandem connected single period delays 35 and 37, the period thereof being either line scan or frame duration. The signal leaving the delay 35 is passed through a bandpass filter 39 and becomes signal V2. The signal leaving the delay 37 is passed through a bandpass filter 41 and becomes signal V3. The filters 39 and 41 have the same characteristics as the filter 33. The graphs of V1, V2 and V3 depicted in FIG. 5 show a full amplitude (100 IRE unit) chroma transition.

Figure 5:
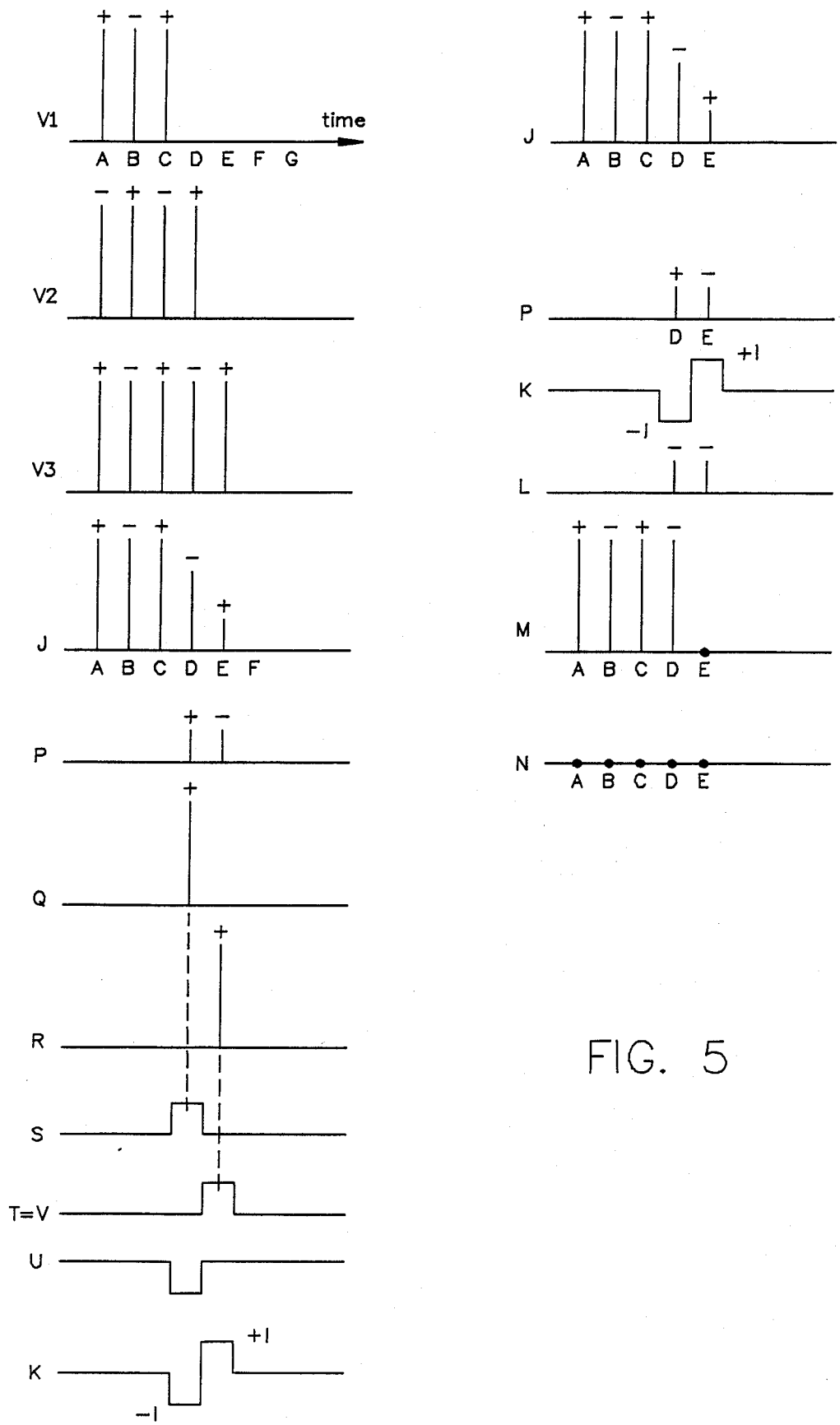
FIG. 5 comprises a set of signal level graphs related along a common horizontal time base illustrating various signals found in the FIG. 4 apparatus.

The V1, V2 and V3 signals (shown in FIG. 5) are amplified in amplifiers 43, 45 and 47 and summed in a summing circuit 49 to yield function $$\frac{2V2 - V1 - V3}{4}$$

which appears on a line 32 and which is shown in graph J of FIG. 5. The V1 and V3 signals are amplified in amplifiers 49 and 51 and summed in a summing circuit 53 to yield a function $$\frac{V1 - V3}{4}$$

which appears on a line 40 and which is shown as graph P of FIG. 5. The V1 and V2 signals are amplified in amplifiers 55 and 57 and summed in a summing circuit 49 to yield a function $V1+V2$ on a line 42 shown as graph Q of FIG. 5; and the V2 and V3 signals are amplified in amplifiers 61 and 63 and summed in a summing circuit 65 to yield a function $V2+V3$ on a line 44 shown as graph R of FIG. 5.

A correction adder 34 receives the Graph J function on the line 32 and puts out a combed chroma signal on a line 36 which is graph M of FIG. 5. A correction signal generator 38 includes a multiplier 46 which multiplies the graph P signal on the line 40 by a continuously variable value lying between zero and minus unity or zero and plus unity in accordance with a logical control value, graph K of FIG. 5, which is derived from the amplitudes of the signals on the lines 42 and 44.

The $V1+V2$ signal at the line 42 is full wave rectified in a rectifier 46 to obtain an absolute amplitude value. This absolute value passes through a circuit 48 if it is above a minimum threshold value, such as one IRE unit (to eliminate noise) and is limited to some maximum value, such as 20 IRE units, for example. A minus unity gain amplifier 50 imparts a minus sign to the value put out by the circuit 48, and the minus sign value is then sent to an adder circuit 52.

The $V2+V3$ signal at the line 44 is full wave rectified in a rectifier 54 to obtain an absolute amplitude value. This absolute value passes through a circuit 56 which operates in the same fashion as the circuit 48. A plus unity gain amplifier 58 imparts a plus sign to the value put out by the circuit 56, and the plus sign value is sent to the adder 52.

The sum put out by the adder 52 on a line 60 provides the plus/minus unity multiplicand for the multiplier 46. The output error correction signal L put out by the multiplier 46 enters the correction subtractor 34 over a line 62.

A subtractor 64 receives a full bandwidth input signal taken from the output of the delay 35 and properly delay matched in a delay match circuit 67 and subtracts from it the main path combed chrominance output signal M on the line 36 in order to extract full bandwidth combed luminance, graph N of FIG. 5, and put it out on a line 66.

Operation of the active comb filter 30 will now be discussed.

At time periods A, B and C:

$V1 = -V2 = V3$ $J = \frac{1}{4}[V2 - 2V2 + V3]$ $K = 0$ $L = 0$ $M = \frac{1}{4}[V1 - 2V2 + V3]$ $N = 0$.

At the time period D:

$V1 = 0, V2 = -V3$ $J = \frac{1}{4}[V1 - 2V2 + V3]$ $K = -1$ $L = \frac{1}{4}[V3 - V1]$ $M = J + L$ or $\frac{1}{4}[-2V2 + 2V3] = -V2$ $N = 0$.

At the time period E:

$V1 = V2 = 0$ $J = \frac{1}{4}[V1 - 2V2 + V3]$ $K = +1$ $L = \frac{1}{4}[V1 - V3]$ $M = J + L = \frac{1}{4}[-2V2 + 2V1] = 0$ $N = 0$.

Thus, it will be appreciated that an error signal L derived from the actual instantaneous V1 and V3 signal values on line 40 as modified by the signal changing multiplier 46 will add to and subtract from the main combed chrominance path 32 in a manner which eliminates artifacts from the luminance component N and which preserves the chroma transitions at point M. As Equation (4) is an approximation, its implementation by the circuitry of FIG. 4 is quite efficient in removing artifacts so long as the periodic chroma transition is fast and occurs e.g. in a linear fashion. If these conditions are not met, then some residual errors remain uncorrected.

The implementation of Equation (3) by the FIG. 6 circuitry eliminates luminance artifacts and chroma blurring for all period chrominance transitions, including those occurring in a slow (over a time interval longer than the e.g. three combing periods) and non-linear way.

As mentioned above, the FIG. 6 circuitry 130 implements Equation (3) in providing a continuously variable error signal (e) for addition to a main path. The structural elements which are commonly found in both the FIG. 4 and FIG. 6 implementations have been given the same reference numerals and will not be further described in connection with FIG. 6.

A correction signal generator 132 has three inputs 134, 136 and 138. The $V1+V2$ signal on the line 134 enters a full wave rectifier 140 which extracts an absolute amplitude value, and a minus unity amplifier 142 assigns a minus sign to the extracted absolute value. This negative value then enters an adder 144.

The $V2+V3$ signal on the line 136 enters a full wave rectifier 146 which extracts the absolute value thereof, and a plus unity amplifier 148 assigns a plus sign to the extracted absolute value. This positive value is also sent to the adder 144 which generates the numerator of Equation (3).

The denominator of Equation (3) is derived from the V3−V1 signal on the line 138. This signal is full wave rectified by a rectifier 150 to obtain an absolute amplitude value, and then it is combined in an adder circuit 152 with a predetermined fixed offset value Epsilon. The numerator from the adder 144 and the divisor from the adder 152 enter a divider circuit 154 wherein the division is carried out.

After a quotient is derived by the operation of the divider 154, the quotient is subjected to plus and minus amplitude limiting action of a dual limiter 156 which limits the quotient to a predetermined range (e.g. between plus and minus unity). The amplitude limited quotient is then multiplied with the V1−V3 signal on the line 40 in the multiplier 46 to yield the Equation (3) error correction signal e. This signal is then combined with the main path signal V1−2V2+3 in the combiner 34, and the result is combed chroma on the line 36 in which the artifacts have been cancelled. As with the FIG. 4 apparatus 30, the circuitry 130 of FIG. 6 enables perfectly combed luminance to be extracted by subtracting combed chroma from the single-scanning-period delayed input composite video signal in the subtractor 64.

A main path corrector 230, of the type symbolized by the corrector 10 of FIG. 1, is depicted in architectural overview in FIG. 7. Therein, a main path 232 carries a quadrature modulated color subcarrier television signal. The bandpass filtered signal (V1) is subjected to a one time period delay by passing through a delay element 234. This delay may be equal to the line scan rate or the picture frame rate, depending on whether the corrector 230 operates in the line scan dimension or in the frame to frame time dimension. An output line 236 from the delay 234 carries a one period delayed version (V2) of the V1 signal and the V2 signal is subjected to a second one period delay by passing through a delay element 238. An output line 240 from the delay 238 caries a two period delayed version (V3) of the V1 signal.

A variable gain amplifier 242 receives the undelayed composite video V1 and sets its instantaneous amplitude value in accordance with the continuously variable coefficient alpha or ½(a), alpha being derived in accordance with equation (2). An output line 244 from the amplifier 242 carries the signal ½(a)V1.

A fixed gain amplifier 246 receives the one period delayed composite video V2 and multiplies its instantaneous amplitude value by one half unity. This product is then put out on a line 248.

A variable gain amplifier 250 receives the twice delayed composite video V3 and multiplies its instantaneous amplitude by the expression ½(1−(a)) wherein (a) is derived in accordance with Equation (2). An output line 252 carries the signal ½(1−(a))V3.

The signals on lines 244, 248 and 252 are combined in an adding circuit 254 which thereby extracts the luminance components located in the spectral vicinity of the chroma subcarrier of the bandpass filtered composite signal by adaptive comb filtering. In accordance with the principles of the present invention, there are no unwanted chroma artifacts in the extracted luminance. This is because the corrector 230 has implemented Equation (1) by continuously varying the coefficients (a) and 1-a) as to cause the sum of (a)V1 and (1−a)V3 to be equal at all times to (½)V2. When this condition obtains, there are no unwanted artifacts in the luminance component at the instance of a chroma vertical transition.

Comb filtered chroma is extracted in the converter 230 by inverting the sign of the (½)V2 signal by an inverter 256 and then combining in an adder 258 the inversion with the signals ½(a)V1 and ½(1−(a))V3 on the lines 244 and 252 respectively. As explained earlier (and this feature is not shown on FIG. 7), when V1=V3=−V2, alpha (a) is automatically switched to ½, and when V1=V3=/=−V2, all three coefficients are made equal to zero for the luminance comb for the duration of this condition. This process yields combed luminance in which artifacts are not present.

The FIG. 7 circuit 230 may be used within a conventional architecture of the type shown in FIG. 8 in order to realize full bandwidth combed luminance Yc. In FIG. 8, a circuit 260 includes an input 262 for receiving full bandwidth composite video from a source (not shown). The signal at the input is split into two paths. A first path passes through a band pass filter 264 having a passband centered about the chroma subcarrier and then through the circuit 230 above described in connection with FIG. 7. Combed chroma Cc leaves the circuit 230 on a line 266. The second path from the input 262 leads through a band-reject filter 268 having a rejection notch centered at the chroma subcarrier and a delay match circuit 270 to a summing circuit 272 wherein combed high frequency luminance components put out by the circuit 230 over a line 274 are combined therewith, resulting in a full bandwidth combed luminance component Yc on a line 276.

While the method and apparatus of the present invention have been summarized and explained by illustrative applications in continuously variable combing coefficient adaptive comb filter processing of a quadrature modulated color subcarrier television signal, it will be readily apparent to those skilled in the art that many widely varying embodiments and applications are within the teaching and scope of the present invention. More particularly, digital implementation of the present invention imposes some constraints to the degree of variability of combing coefficients, and it will be readily apparent to those skilled in the art that the quantization at the proper resolution imposed by digital implementations, elements and techniques of variable coefficients processing does not in any way impair the efficiency of the present invention, and that the examples presented herein are by way of illustration and exmaple only and should not be construed as limiting this invention, the scope of which is as set forth in the following claims.

We claim:

1. An improved method for extracting at least one of chroma and luminance from a quadrature modulated subcarrier color television input signal in accordance with the NTSC signal format, including the steps of:

delaying said input signal through a plurality of predetermined delay periods wherein the duration of each delay period is related to at least one of line scan rate and picture frame rate, thus generating undelayed and delayed signals, filtering said undelayed and delayed signals so that energy components of the input signal lying in the vicinity of the subcarrier frequency are passed and energy components lying outside of said vicinity are rejected, thereby obtaining bandpass filtered undelayed and delayed signals, detecting amplitude and sense of periodic transitions lying in the passband of the chroma, the period of said periodic transitions being equal to each said predetermined delay period, to establish the value of at least one continuously variable coefficient having a value lying in a range between minus unity and plus unity, multiplying two of said undelayed and delayed signals by said continuously variable coefficient to produce an error correction signal substantially in accordance with the following approximation:

$$e = \tfrac{1}{4}(V1 - V3)(|\overline{V3+V2} - \overline{V1+V2}|),$$

wherein $|\ |$ denotes that the values enclosed thereby are limited to some maximum amplitude level and wherein BAR V indicates the absolute value of the value thereunder, additively combining a linear function of said undelayed and delayed signals with said error correction signal thereby extracting at least one of the luminance and chroma components of said input signal at the chroma passband.

2. The method set forth in claim 1 wherein each delay period is the duration of a picture line scan.

3. The method set forth in claim 1 wherein each delay period is the duration of a picture frame.

4. The method set forth in claim 1 wherein the linear function of said undelayed and delayed signals which is additively combined with said error correction signal is substantially of the form $+2V2 - V1 - V3$.

5. An improved system for comb filter separation of chrominance components from a quadrature modulated color subcarrier television signal in accordance with the NTSC signal format, the system including:

an input for receiving said television signal, delay means connected to said input for delaying said television signal by a single predetermined period and by two predetermined periods wherein each said predetermined period is related to one of horizontal scan line period and picture frame period, bandpass filter means connected to said input and to said delay means for passing energy groups of said signal, energy groups of one period delay of said signal, and energy groups of two period delay of said signal, in the vicinity of said color subcarrier in order to provide an undelayed signal V1, a once delayed signal V2 and a twice delayed signal V3, first combining means for combining V1, V2 and V3 signals into a first signal function, second combining means for combining V1 and V3 into a second signal function, third combining means for combining V1 and V2 into a third signal function, fourth combining means for combining V2 and V3 into a fourth signal function, control means connected to receive said third and said fourth signal functions for additively generating a multiplicand value lying in a range between minus unity and zero in the case of the third signal function and lying in a range between plus unity and zero in the case of the fourth signal function, multiplier means connected to receive said second signal function as a multiplier value and said multiplicand value, for putting out a product substantially in accordance with the following approximately:

$$e = \tfrac{1}{4}(V1 - V3)(|\overline{V3+V2}| - |\overline{V1+V2}|),$$

wherein $|\ |$ denotes that the value enclosed thereby is limited to some maximum amplitude level and wherein BAR V indicates the absolute value of the value thereunder, additive combining circuit means for combining said first signal function and said product to put out said separated combed chrominance components.

6. The system set forth in claim 5 wherein said first signal function is $$\frac{-V1 + 2V2 - V3}{4}.$$

7. The system set forth in claim 5 wherein said predetermined period is the horizontal line scan period.

8. The apparatus as set forth in claim 5 wherein said predetermined period is the picture frame period.

* * * * *